United States Patent [19]

Völsch et al.

[11] Patent Number: 5,403,488
[45] Date of Patent: Apr. 4, 1995

[54] PROCESS FOR THE REGULATION OF AN ACTIVATED SLUDGE CLARIFICATION PLAN

[75] Inventors: Andreas Völsch, Beverstedt; Werner Nader, Edingen-Neckarhausen, both of Germany

[73] Assignee: Orpegen Medizinisch-Molekular-Biologische Forschungsgesellschaft mbH, Heidelberg, Germany

[21] Appl. No.: 185,297

[22] Filed: Jan. 24, 1994

Related U.S. Application Data

[63] Continuation of Ser. No. 627,708, Dec. 14, 1990, abandoned.

[51] Int. Cl.[6] .............................................. C02F 3/12
[52] U.S. Cl. ..................................... 210/614; 210/739; 210/903; 210/906; 210/908; 210/912
[58] Field of Search ................ 210/614, 626, 739-746, 210/903, 906, 908, 909, 912

[56] References Cited

U.S. PATENT DOCUMENTS

| | | | |
|---|---|---|---|
| 3,986,932 | 10/1976 | Brushwyler et al. | 210/614 |
| 4,183,810 | 1/1980 | Baenens et al. | 210/614 |
| 4,329,232 | 5/1982 | McKenna | 210/614 |
| 4,564,453 | 1/1986 | Coplot et al. | 210/614 |
| 4,620,930 | 11/1986 | McDowell | 210/614 |
| 5,110,744 | 5/1992 | Baughman et al. | 210/614 |

*Primary Examiner*—Thomas Wyse
*Attorney, Agent, or Firm*—Felfe & Lynch

[57] ABSTRACT

The present invention provides a process for the regulation of the activated sludge step of a clarification plant by control of the decomposition efficiency of the activated sludge, wherein an activated sludge sample is incubated under precisely defined conditions, which are optimised with regard to the pH value, the temperature and the salt concentration, with the substrate or substrates of interest above the saturation range and, in the initial phase, the decrease of the substrate or the increase of a decomposition product is determined kinetically as a measure of the decomposition efficiency for this substrate and the measured value determined is used as regulating value for the control of the clarification plant.

4 Claims, 11 Drawing Sheets

PROCESS FOR THE REGULATION OF AN ACTIVATED SLUDGE CLARIFICATION PLAN

This application is a continuation of application Ser. No. 07/627,708, filed Dec. 14, 1990, now abandoned.

The present invention is concerned with a process for the control of the activated sludge step of a clarification plant by control of the decomposition capability of activated sludges.

Hitherto, the efficiency of clarification, plants was measured by measurement in the waste water inflow and outflow of a clarification plant of the substances to be decomposed or eliminated, the reduction of the particular contamination load thereby being calculated in percentage of the measured value. As substrates to be decomposed, there are used, for example, chemical and biological oxygen requirement, ammonium, nitrite and nitrate nitrogen. However, the so obtained data are only conclusive over comparatively long periods of time since the values are influenced by many parameters. Short-term variations in the efficiency of the activated sludge cannot be acquired therewith so that these data are not suitable as regulating values for the control of clarification plants. The activity of sludges was hitherto determined only with regard to the elimination of organic substances which are easily decomposed by way of respiratory measurement which are detected by the $BSB_5$ (biological oxygen requirement). Furthermore, only a few measurable operational parameters were available for clarification plants which are suitable for a control, for example the sludge-volume index for the settlement behaviour of the sludge, the oxygen concentration in the activated ponds, the age of the sludge or the amount of the excess sludge. However, in this way, the problems of clarification plants and especially of industrial plants cannot be taken into account in the case of the removal of special disturbing substances.

Therefore, it is an object of the present invention to find a process with which parameters can be determined quickly, simply and reproducably which are suitable for the regulation of the activated sludge step of a clarification plant.

Thus, according to the present invention, there is provided a process for the regulation of the activated sludge step of a clarification plant by control of the decomposition capability of the activated sludge, wherein an activated sludge sample is incubated under precisely defined conditions, which are optimized with regard to the pH value, the temperature and the salt concentration, with a substrate or substrates of interest above the saturation range and, in the initial phase, the decrease of the substrate or the increase of a decomposition product is determined kinetically as a measure of the decomposition capability for this substrate and the measured value determined is used as regulating value for the control of the clarification plant.

With the process according to the present invention, the efficiency of activated and digested sludge for particular substrates can be determined within a short period of time. The measurements give regulating values which simplify and improve process technical interventions in the breakdown and elimination capability and thus serve for the improvement of the capability and cost optimization. The measurement of the command variables takes place under optimal and standardized conditions analogously to an enzyme determination.

For this purpose, a substrate of interest or several substrates are measured in parallel under precisely defined conditions which are optimized with regard to pH value, temperature and salt concentration. The particular suitable conditions can be determined by measurements or are known for the particular substrate. The determination of the substrates takes place according to known methods in which case there are preferably used the processes laid down for the substrates in question in the German Standard Methods (Deutsche Einheitsverfahren zur Wasser-, Abwasser- und Schlammuntersuchung (DEV): Physikalische, chemische, biologische und Bakteriologische Verfahren (published: Fachgruppe Wasserchemie of the Gesellschaft Deutscher Chemiker(VHC Verlagsgesellschaft, Weinheim) hereby incorporated by references. Under these conditions, initially there is obtained a reaction of zero order with a linear decrease of the substrate and a linear increase of the product. Only the linear, upper part of the reaction curve is used according to the present invention for the activity determination. Preferably, in the initial phase, two measurement are carried out at an interval of 5 to 60 minutes. The reaction velocities so determined are linearly dependent upon the amount of catalyst used, from which can be deduced the amount of the bacteria present in the sludge in combination with their state of activity. So long as the measurements are carried out under precisely defined conditions, measured values are obtained which are also comparable over comparatively long periods of time and in different clarification plants. In contradistinction to known measurement processes for decomposition efficiencies, the measurement time is reduced from several hours to a few minutes since only the initial velocity is measured. Thus, the measured values determined are quickly available for regulating processes and, in addition, can be standardized so that for comparatively long periods of time and for several clarification plants, regulations can be made for the control which are orientated to these values.

The process according to the present invention is suitable for the control of the decomposition efficiency of many different substrates. Thus, the process is, for example, suitable for the control of the nitrification, biological phosphate elimination, denitrification, removal of heavy metals and the decomposition of organic substances which are difficult to break down.

By nitrification is understood the oxidation of ammonium to nitrite and then from nitrite to nitrate. For this purpose, the activated sludge can be incubated in reaction vessels with strong aeration at constant tempering and constant pH with an excess of ammonium or nitrite. The ammonium and nitrite oxidation can be determined independently of one another, whereby, in the first case, the nitrite-oxidizing bacteria are inhibited with chlorate and, in the second case, the ammonium-oxidizing bacteria are inhibited with allylthiourea. At different times, samples are taken and the concentrations of the nitrite formed or nitrite consumed, of ammonium consumed or of the nitrate formed are determined photometrically according to known methods. A two-point measurement with incubation times of 5 to 20 minutes is normally sufficient for carrying out the test so that first measurement values are already available only a short time after taking the sample. The detection can also be carried out via electrodes, in which case there can be measured either the decrease of the oxygen via a Clark electrode or the increase of nitrate via a nitrate electrode. This measurement principle is also suitable for the fully automated measurement of the nitrification efficiency in the by-pass of an activated pond.

In the case of biological phosphate elimination, phosphate is taken up by bacteria of the activated sludge, stored as polyphosphate and thus removed from the waste water stream in the clarification sludge. The dephosphatization can be determined via the decrease of the concentration of orthophosphate in the reaction medium. For this purpose, the activated sludge sample is incubated with phosphate in a buffered salt nutrient medium, at different times the sludge is separated from this medium and the phosphate is determined in the medium, for example by photometric quantification as phosphomolybdenum complex. The initial velocity of the phosphate decrease gives the measured value for the efficiency of a sludge for dephosphatization.

The denitrification serves for the removal of nitrate from the waste water. In the case of this process, with a deficiency of oxygen, organic substrate is not oxidized with atmospheric oxygen but with nitrate as oxidation agent, in which case elementary nitrogen results. The denitrification efficiency can be determined inter alia by incubating the activated sludge sample with nitrate and a suitable substrate, for example glucose or acetate, in a measurement cuvette which has been gassed with argon for the adjustment of oxygen-free conditions and in which the nitrate concentration can be measured via a nitrate electrode. In the case of optimum temperature, pH and salt concentration and in the case of saturated substrate concentrations, the nitrate decrease at the beginning of the reaction is linear to the time and is a measure for the denitrification efficiency of a sludge. The nitrate concentration can also be determined colorimetrically according to known methods.

A further important factor is the removal of heavy metals from the waste water. This can take place by the take up of heavy metals in bacteria which remove phosphate from the waste water or store it as polyphosphate. In this case, bivalent cations are also taken up and stored via complex formation on the polyphosphate. The takeup velocity of the activated sludge for the heavy metal can be determined by means of known processes for the determination of heavy metals, for example atom absorption spectrometry or ion scan analysis.

Also important is the supervision of the breakdown efficiency for organic substances which are difficult to break down, for example halogenated hydrocarbons and aromatics or sulphonated aromatics. The breakdown efficiency of the activated sludge for these halogenated hydrocarbons can be determined via the increase of the chloride in the nutrient medium or via chromatographic determination of the starting substances or of the resulting products.

According to the present invention, it is possible, with the help of measured values, exactly to describe an activated sludge with regard to its specific efficacy and quality. In this way, it is possible to control and regulate very exactly the clarification with regard to particular breakdown efficiencies aimed for. Thus, for example, the introduction of oxygen can be very precisely adjusted dependent upon the breakdown efficiency. Since the aeration of the activated pond is the most energy-intensive process in the operation of a clarification works, cost savings can be achieved in the case of the same efficiency of the clarification works. The oxygen supply into the activated ponds was hitherto orientated by the total respiratory activity which mainly included the BSB5 breakdown. On the basis of the oxygen consumption conditions of the activated sludges, oxygen concentrations of 1 to 2 mg./liter were regarded as being sufficient. Under certain conditions, this cannot suffice for the breakdown efficiency of the nitrification and, for optimization, it is then of advantage to orientate the oxygen supply to the nitrification efficiency. As a further regulation possibility in the case of clarification works with parallel rows of ponds, there is the admixture of excess sludges from rows of ponds of high efficiency into rows of ponds of lower efficiency. The addition of adjuvants, such as iron ions, into the activated ponds is also used for the improvement of the sludge properties and for the precipitation of phosphates. In this way, the age of the sludge can also be increased and the efficiency, for example with regard to the nitrification, can be improved. Since the dosing in of iron is expensive and not without problems for the environment and, in addition, can result in problems in the case of removal of the clarification sludges, it should be reduced to the minimum amount. Furthermore, numerous nutrient materials can exert a positive effect on the activated sludge. By these are to be understood all chemical substances which can influence the waste water composition. Examples thereof include trace elements, growth factors, chemical agents which are able to block inhibiting materials, adjuvants, for example iron ions, which bring about a phosphate precipitation in the pond and are also able to bring about a change of the sludge density, fertilization of unbalanced loaded industrial waste waters with nitrates and phosphates. In some cases, these substances are expensive and must, in some cases, be measured very exactly in order not to bring about any damaging effects. Thus, fertilizations with phosphate, nitrate or urea must be reduced to a minimum amount in order to avoid a eutrophication of the water. Too high a dosing of iron salts can also have a negative effect, especially in combination with too high a dosing of other nutrient materials, such as folic acid. By measurement of the specific activated sludge activity, the optimum dosing can be recognised and controlled.

Experience has shown that sudden loadings such as occur, for example, due to large amounts of water in the case of rain have a negative effect on the nitrification. In order to avoid such sudden loadings, water storage chambers can be provided in the canalisation system. The introduction of the rain water there collected can then take place controlled by the measured data according to the present invention.

Special functions of clarification works, such as biological dephosphatisation and denitrification, are achieved by the incorporation of anaerobic and anoxic zones before the aeration zone. The residence time of the sludge in such zones and the mixing ratio between sludge and waste water are, as a rule, determined empirically. An orientation of these operational parameters to the functional data here provides a further improvement.

The regulation of the pond temperatures via the functional values also provides an optimization of the breakdown efficiency.

Thus, with the process according to the present invention, it is possible to improve the functional ability of clarification works by regulation via the measured values determined. In particular, it is possible in the case of different clarification works objectively to carry out the removal of special disturbing substances such as occur especially in the case of industrial clarification plants.

The measured values obtained by measurement of the reaction velocity of zero order can, furthermore, be utilized for the prediction of the breakdown efficiency of the clarification works under real and notional conditions when they are placed in relationship to the kinetic characteristics to be determined individually for each breakdown capacity (dependence of the reaction velocity on the temperature, pH, substrate concentration, inhibiting materials and the like) and to the operational parameters of the clarification works (activated pond volume, mixing ratio of waste water to activated sludge, residence time of the waste water and the like). Exact prognoses can then be made for the change of the efficiency in the case of a change of the operational parameters which make possible an optimisation of the clarification works in the sense of an improvement of the efficiency.

Therefore, an object of the present invention is also the use of the process according to the present invention for the prediction of the efficiency of a clarification work under different operational conditions and for the improvement of this efficiency by a change of the process technology.

The breakdown efficiency of the active sludge stage of biological clarification plants depends upon the activity of various specialised types of bacteria. For the assessment of the efficiency of these activated sludges with regard to nitrification, denitrification, biological phosphorus elimination, elimination of heavy metals and oxidation of chemicals which are difficult to break down there has hitherto been no measurable values which are suitable for the control of regulation of the clarification works. Hitherto, these efficiencies were assessed on the basis of analysis data of the inflowing and outflowing waste water. According to the present invention, this problem was solved in that the activity of the activated sludges is determined, as in the case of an enzyme determination, as maximum velocity by measurement of a reaction kinetic of zero order, a standardizable measured value is calculated and is used as regulating value for the optimisation of the efficiency. It is thereby of importance that this measurement can be carried out within a short period of time and is available for immediate process-technical changes. Thus, for example, for the oxidation of ammonium and nitrite, such regulation values were used for the control of a clarification works and an efficiency optimisation achieved via simple process-technical measures. Furthermore, the measured values determined according to the present invention are suitable for the prediction of the effective ability of the clarification works under real and assumed operational conditions since the natural dependencies of the bacterial activities upon the operational parameters are known or can be determined. From this can be derived prognoses for process changes in the sense of an optimisation of the efficiency.

The present invention will now be explained in more detail in the following Examples and with reference to the accompanying drawings in which FIG. 1 shows a diagram in which is plotted the decrease of the ammonium and the increase of the nitrate in the case of monitoring of the nitrification;

Figure 9:
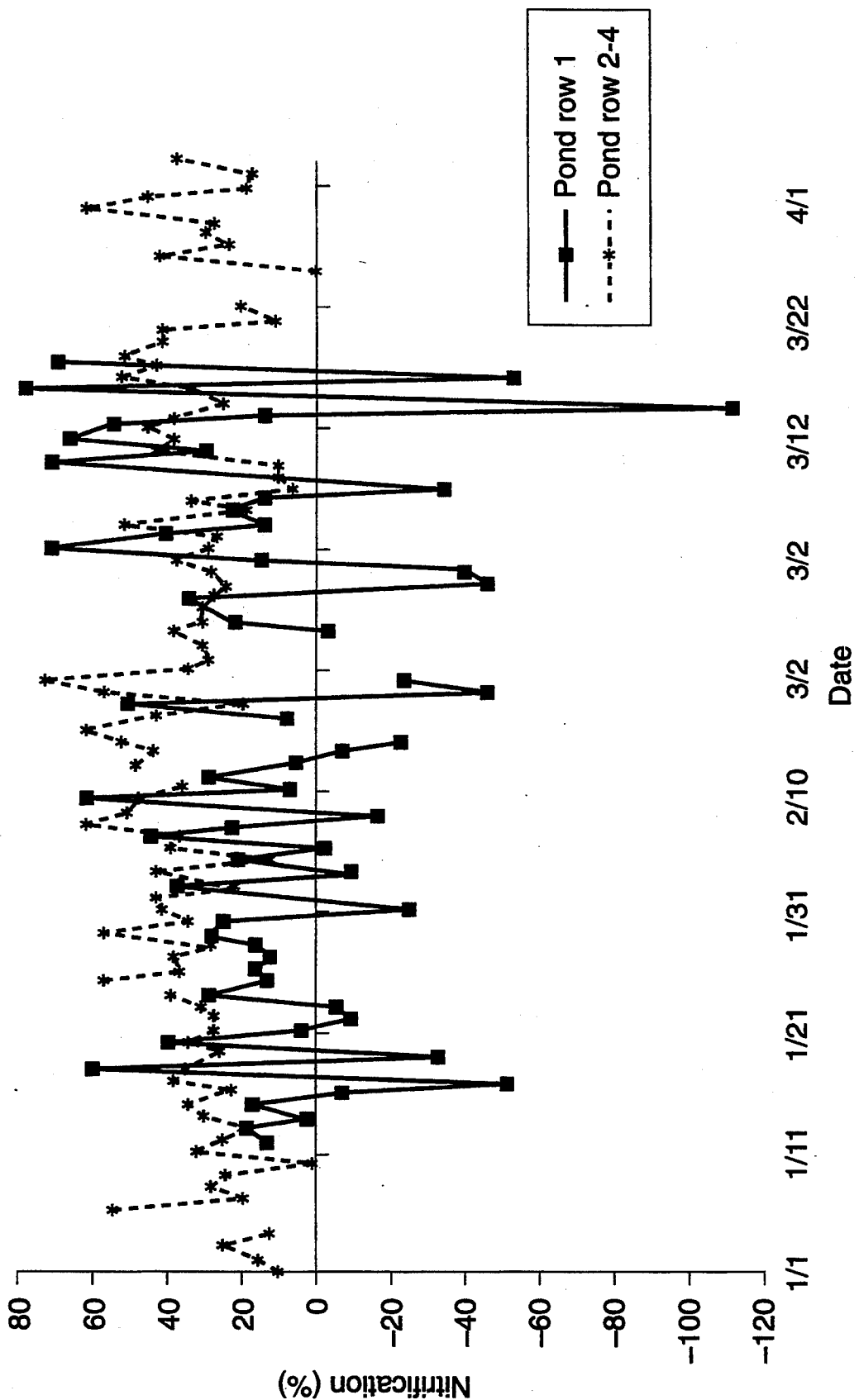
Figure 10:
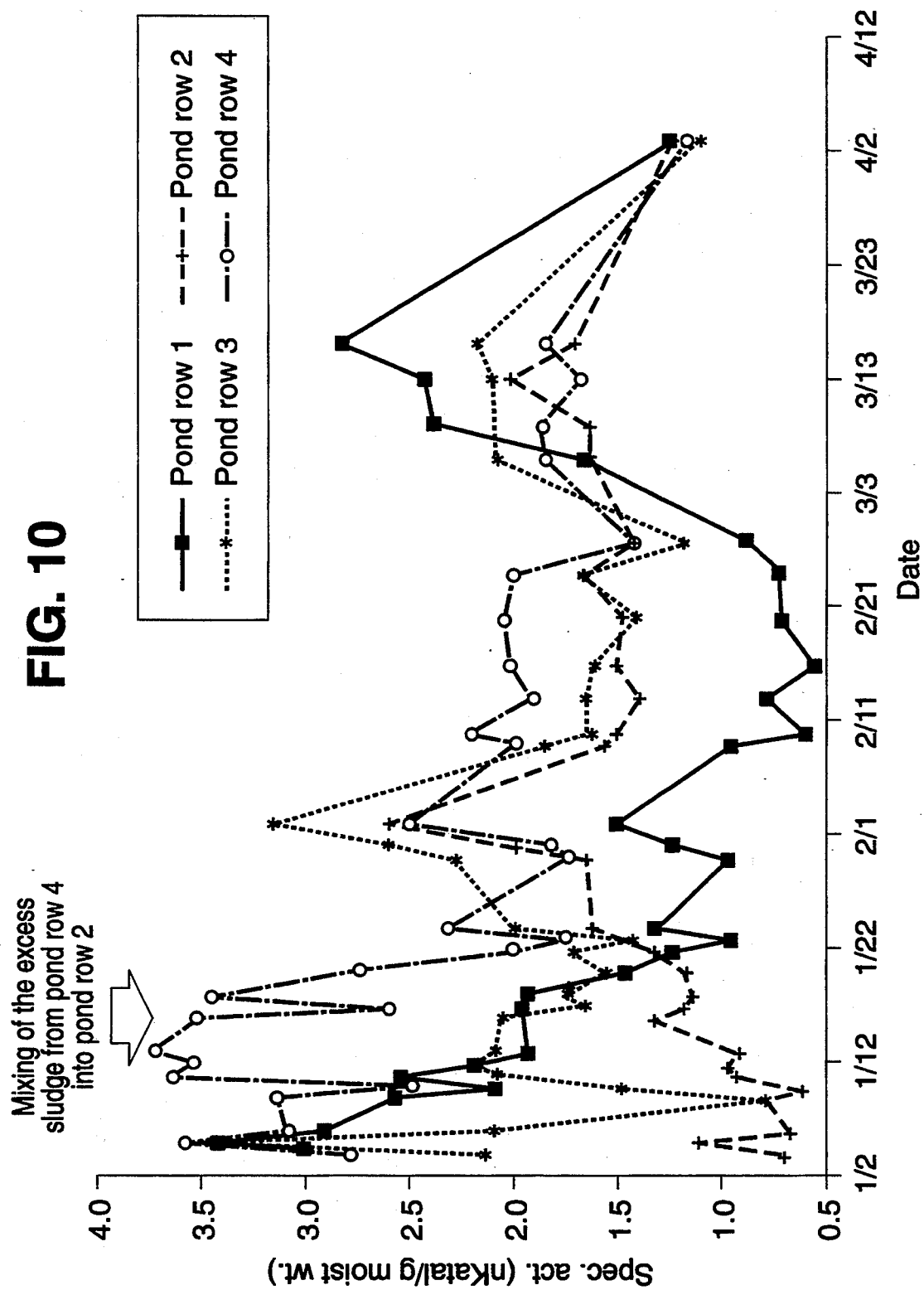
Figure 11:
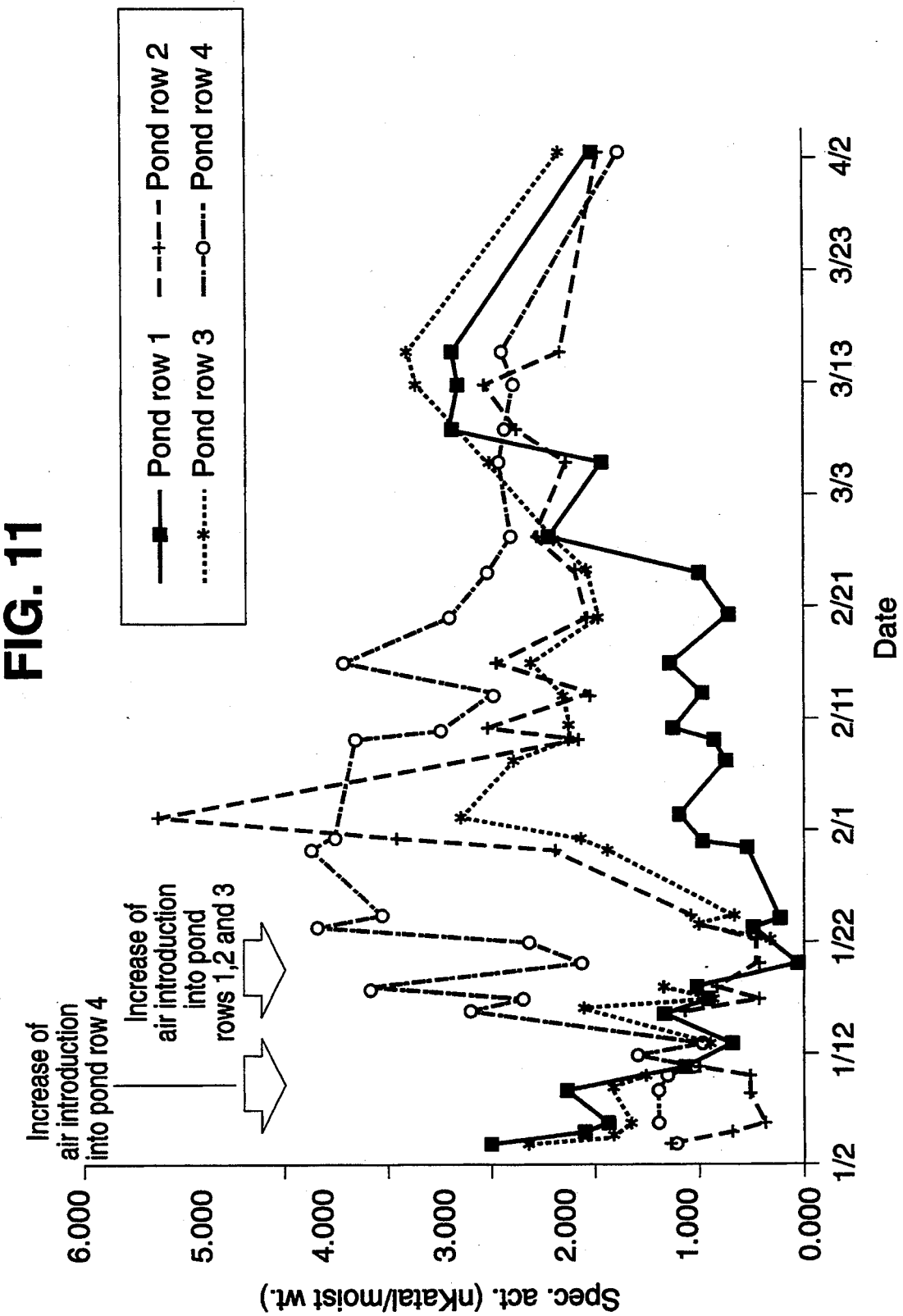

FIG. 9 shows a diagram in which is plotted the course of the nitrification efficiency in the clarification works in Heidelberg in the first row of ponds compared with the average values from the second, third and fourth rows of ponds; and FIGS. 10 and 11, show diagrams in which are plotted the specific activities of the ammonium oxidizing and nitrite oxidizing bacteria in which regulatory measures are made in FIG. 10 by sludge mixing and in FIG. 11 by increasing the aeration.

EXAMPLE 1

Determination of the specific activity of the ammonium oxidizing bacteria in activated sludge Activated sludge of the north clarification works, Abwasserzweckverband Heidelberg, is mixed in a ratio of 1:1 in a total volume of 6 ml. with a salt medium which supports the growth of ammonium-oxidizing and nitrite-oxidizing bacteria (see S. Soriano and N. Walker, Isolation on ammonia-oxidizing autotrophic bacteria, J. Appl. Bacteriol, Volume 31, pp. 493–497/1968) hereby incorporated by references. It contains all necessary mineral salts, carbon dioxide as carbon source and phosphate as nutrient salt and also buffer. The pH value of such a batch is 7.2. As source of energy, there is added the substrate ammonium for ammonium-oxidizing bacteria in a concentration of 2.5 mM and the substrate nitrate for the nitrate-oxidizing bacteria in a concentration of 0.6 mM, the substrates being added before commencement of the measurement. This mixture is aerated in reagent glasses in a tempered dry incubator at 30° C. and by means of an aquarium pump through an injection needle or a frit. At different times, samples are removed and the activated sludge removed by centrifuging at at 10000 g for 4 minutes or by filtration. Nitrate, nitrite and ammonium can now be determined photometrically in the medium according to the German Standard processes (DEV DIN 38405 and 38406) hereby incorporated by references. DIN 38405 consists of three alternative methods D9, D10 and D11 the central aspects of which are given in items 3.2.2 (D9), 3(D10) and 3 (D11) therein as follows:

D9

3.2.2. Basic Principles p-fluorophenol is nitrated by nitrate ions in strongly sulfuric solution to give 2-nitro-4-fluorophenol;

After steam distillation and collecting the distillate in sodium hydroxide solution this compound leads to a yellow color which is measured photometrically.

D10

3 Basic Principles of the Process

Nitrite ions diazotize, in acidic solution (pH~1.9), sulfanilamide which then forms a red coloring material by coupling it with N-(1-naphthyl)-ethylenediamine.

The spectral absorption measure (extinction) is in linear relation to the nitrite content and is measured at a wavelength of 540 nm.

D11

3 Basic Principles of the Processes 3.1 In acidic solution, orthophosphate ions form a complex with molybdate ions in the presence of antimony ions, which complex is reduced by ascorbic acid to give phosphomolybdenum blue. The intensity of the color is proportional to the orthophosphate content of the measuring solution in the range of application given. The photometric determination is carried out at a wave length of 880 nm. If a filter photometer is used, measurement can also be carried out at 700 nm, however, sensitivity is reduced.

3.2 For the determination of low orthophosphate contents the extraction method can be applied.

3.3 Polyphosphates and several organic phosphorus compounds are hydrolyzed by boiling in strongly acidic solution (pH<1) to give orthophosphate.

3.4 Stable phosphorus compounds can be decomposed by strong oxidants (potassium peroxodisulfate or nitric acid/sulfuric acid).

3.5 A process for the determination of total phosphate, using perchloric acid as a decomposition agent, is in preparation.

In the case of DIN 38 406 the central aspect of the process is formulated in item 2.2 (E5) as follows:

2.2 Basic Principles of the Process

Figure 1:
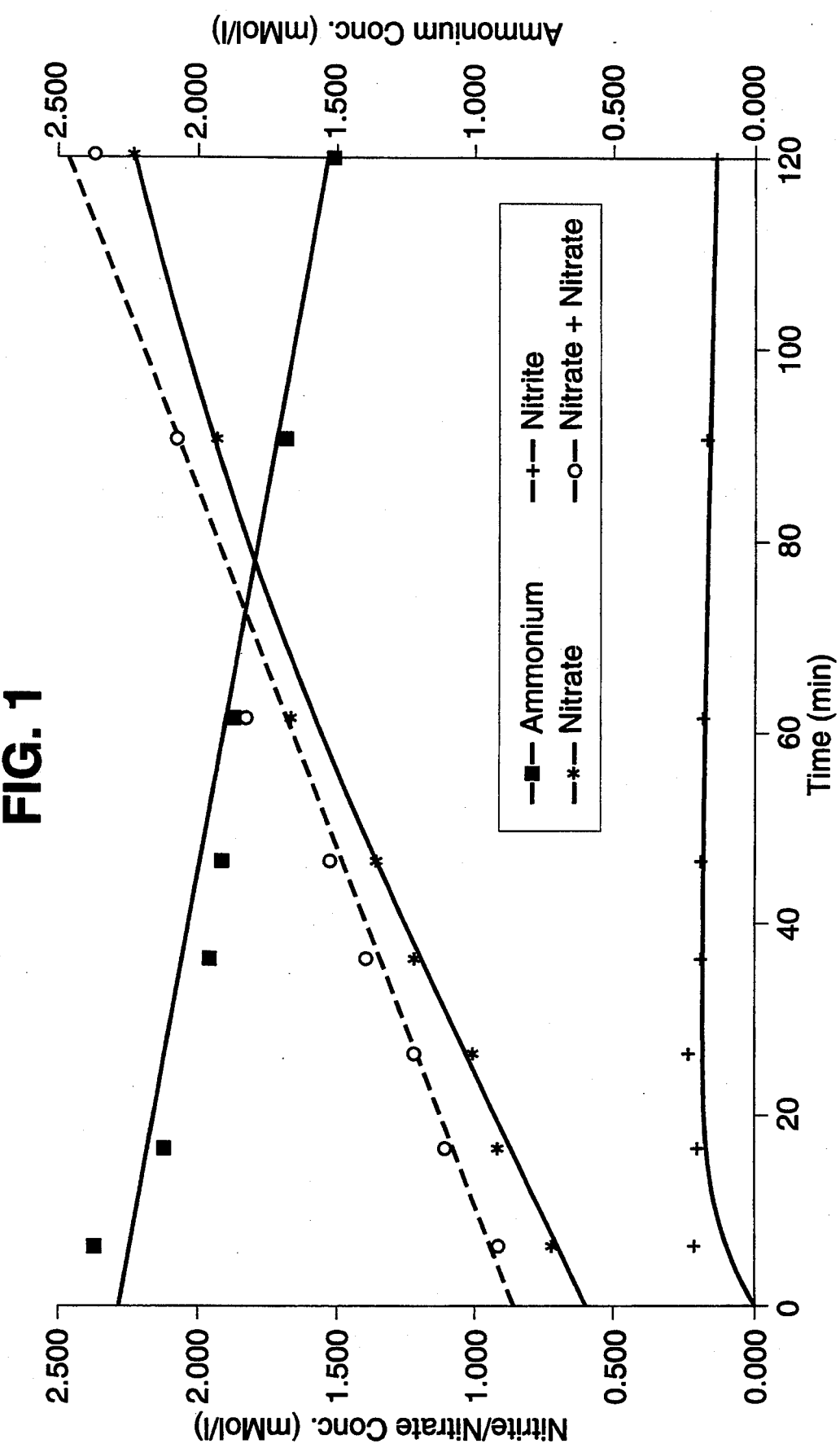
Figure 2:
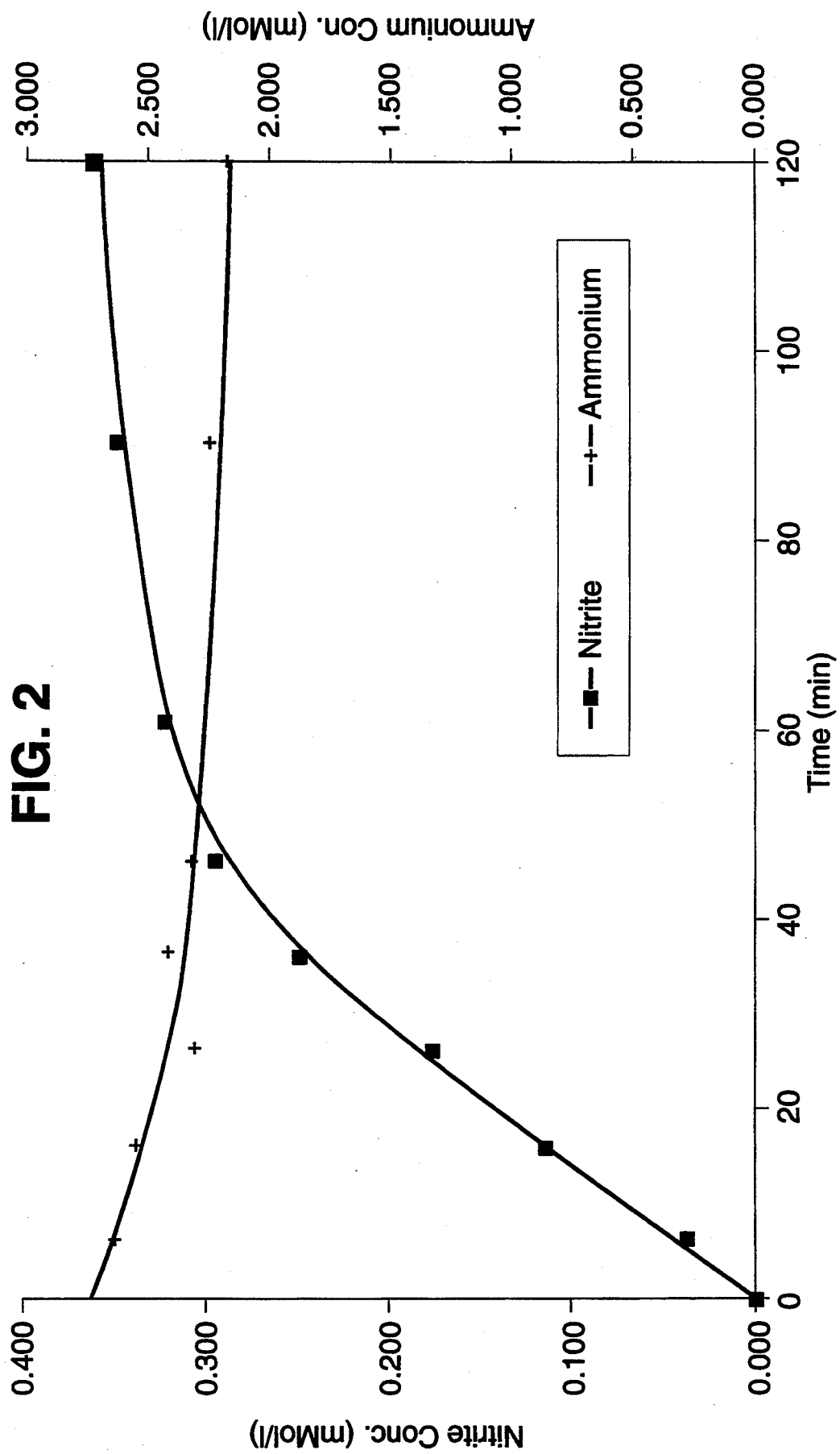
FIG. 2 shows a diagram in which is plotted the increase of the nitrate concentration in the case of measurement of the activity of ammonium-oxidizing bacteria in the case of the presence of saturated conditions.
Figure 3:
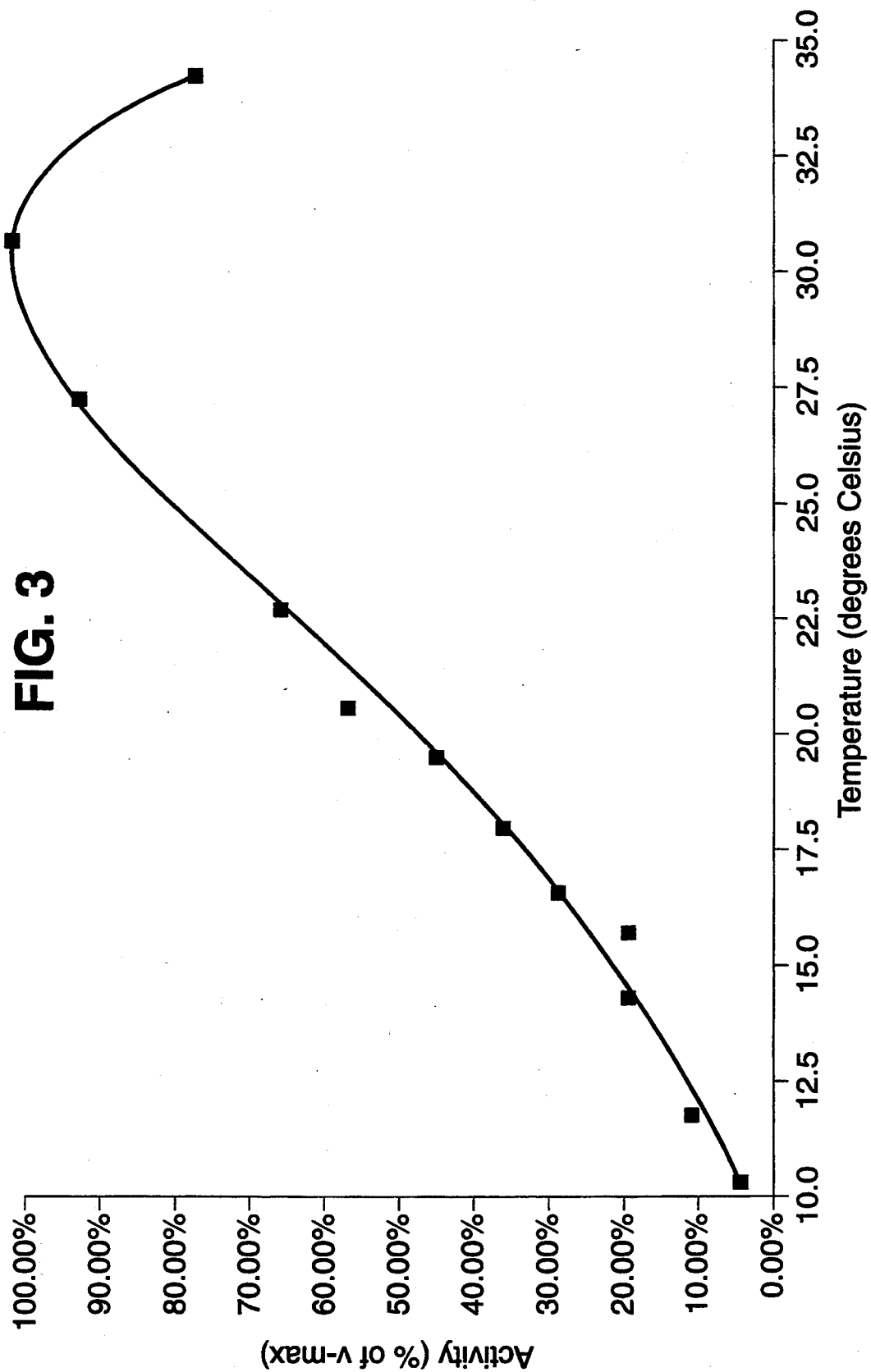
FIG. 3 shows a diagram in which is illustrated the dependency of the reaction velocity of the oxidation of ammonium upon the temperature.
Figure 4:
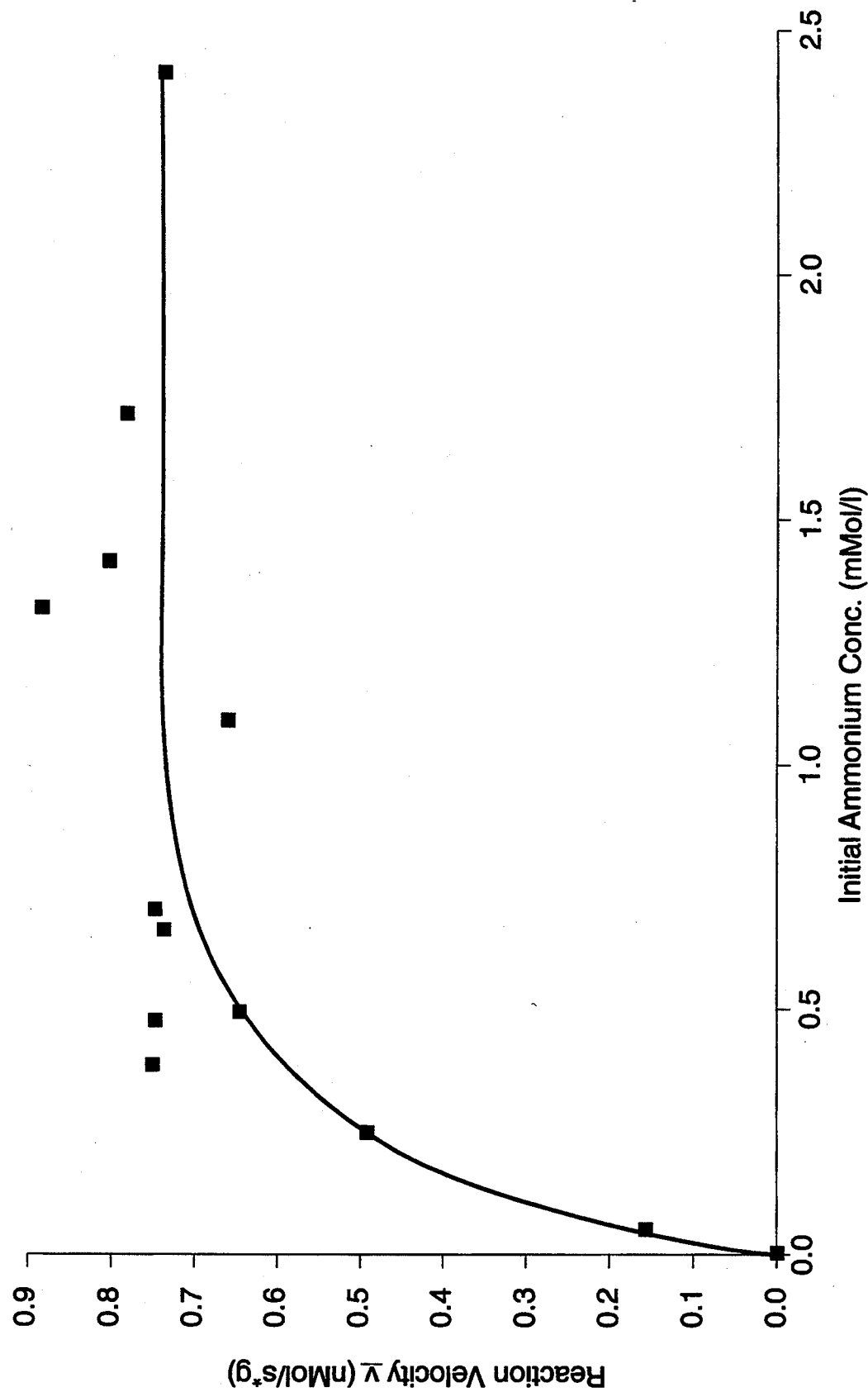
FIG. 4 shows a diagram in which is illustrated the dependency of the reaction velocity upon the ammonium concentration.
Figure 5:
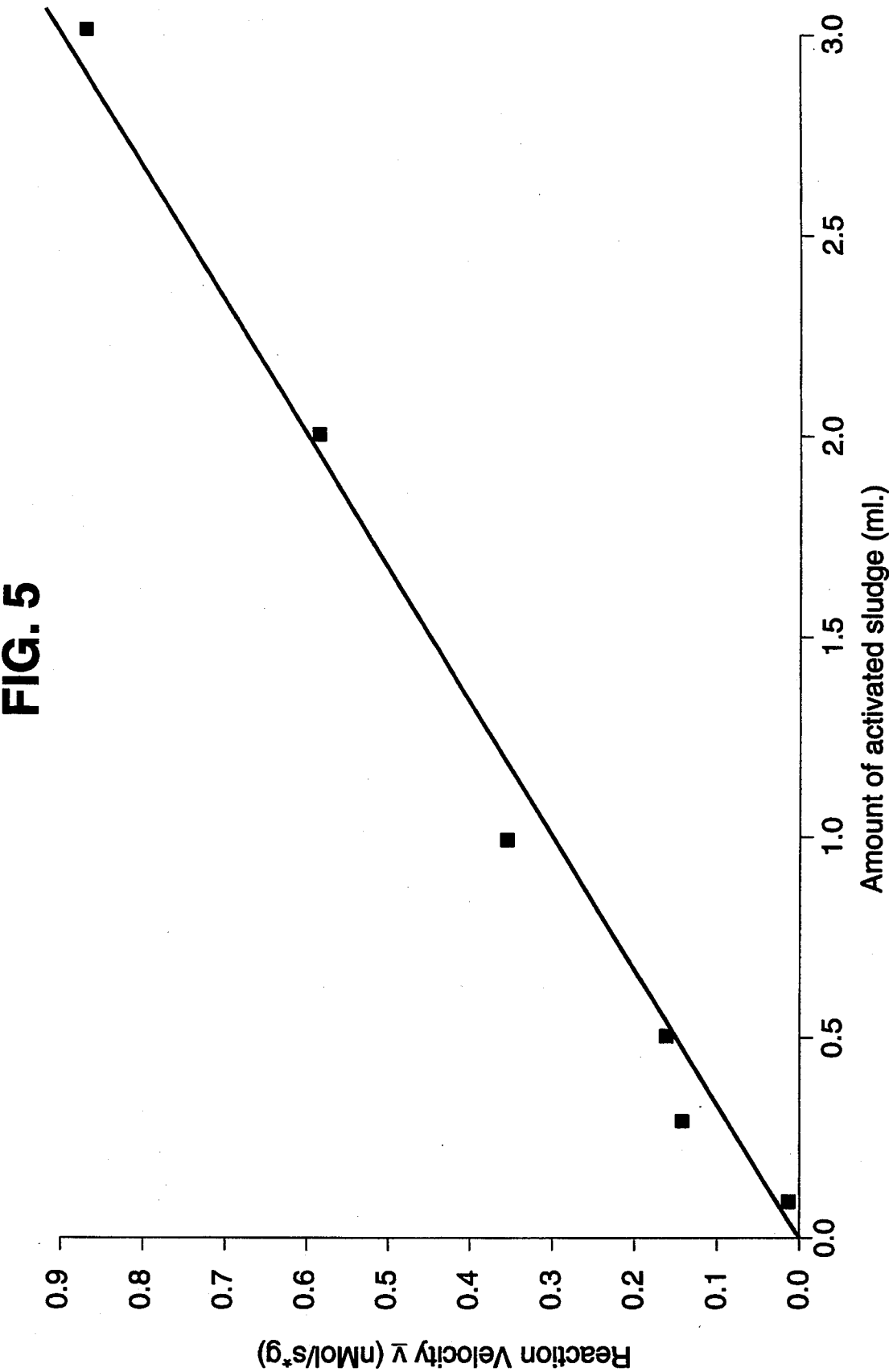
FIG. 5 shows a diagram in which the amount of activated sludge used is placed in relationship to the reaction velocity.

Ammonium ions react, at a pH of about 12.6, with hypochlorite ions and salicylate ions in the presence of sodium pentacyanonitrosylferrate (2)-(sodium nitroferricyanide) as a catalyst to give a blue coloring material. The hypochlorite ions are formed in the alkaline medium by hydrolysis of the ions of the dichlorocyanuric acid. FIG. 1 of the accompanying drawings shows the decrease of the ammonium and the increase of the nitrate in such a test batch. In the case of this measurement, there is detected the activity not only of the ammonium-oxidizing bacteria but also of the nitrite-oxidizing bacteria which is to be ascertained by the initial increase of the nitrite concentration and thereafter the decrease. The ammonium-oxidizing bacteria can be determined separately when the nitrite-oxidizing bacteria are inhibited by the addition of sodium chlorate in a concentration of 18 mM. From FIG. 2 of the accompanying drawings, in such a test batch can be seen a linear increase of the nitrite concentration in the first 30 minutes. In this period of time, the catalysis behaves like a reaction of zero order and the initial velocity calculated from the increase of the product is a standardisable measured value for the determination of the effectiveness of the ammonium-oxidizing bacteria in activated sludges. For the present case, for the initial velocity was measured the formation of 6.5 nMoles of nitrite and the consumption of 7.1 nMoles of ammonium per minute and per ml. of the reaction batch. As reference value, there can be determined the moist weight of the sludge used but also the dry weight, the calcination loss or the protein or DNA content of the sludge. In the present case, 1 ml. of the reaction batch contained 43.4 mg. of moist activated sludge from which follows a reaction of about 149 nMoles of substrate to product per minute per gram moist weight. Since the reaction took place under optimum pH, temperature and substrate conditions, the rate of decomposition corresponds to the maximum velocity $V_{max}$ which, as in the case of enzymes, can be expressed in the SI Unit Catal. There is given a specific activity of the activated sludge for the ammonium oxidation of 2.49 nCatal per gram of moist weight. The temperature optimum is illustrated in FIG. 3 of the accompanying drawings in which the reaction velocity is plotted in percentage of the maximum possible reaction rate against the temperature. FIG. 4 of the accompanying drawings shows the dependency of the reaction velocity v upon the ammonium concentration from which it follows that, in the case of an ammonium concentration in the region above 0.5 mM, the saturation of the catalyst is reached. Under such optimum conditions, the reaction velocity v is directly proportional to the amount of activated sludge used, which follows from FIG. 5 of the accompanying drawings.

In the above-described procedure, the test can be carried out quickly in the following way:

Activated sludge is mixed in a ratio of 1:1 with the salt medium, 2.5 mM ammonium and 18 mM sodium chlorate, incubated at 30° C. with aeration for 5 minutes and then the first sample is taken and the nitrite content determined photometrically after a 50 fold dilution of the sample. After 15 minutes, a further sample is taken and the nitrite content determined. From the difference of the photometric determinations, after recalculation to 1 second and 1 g. moist weight of the activated sludge used, there is given the standardised measured value for the activity of the ammonium-oxidizing bacteria in Catal per gram of moist weight.

EXAMPLE 2

Figure 6:
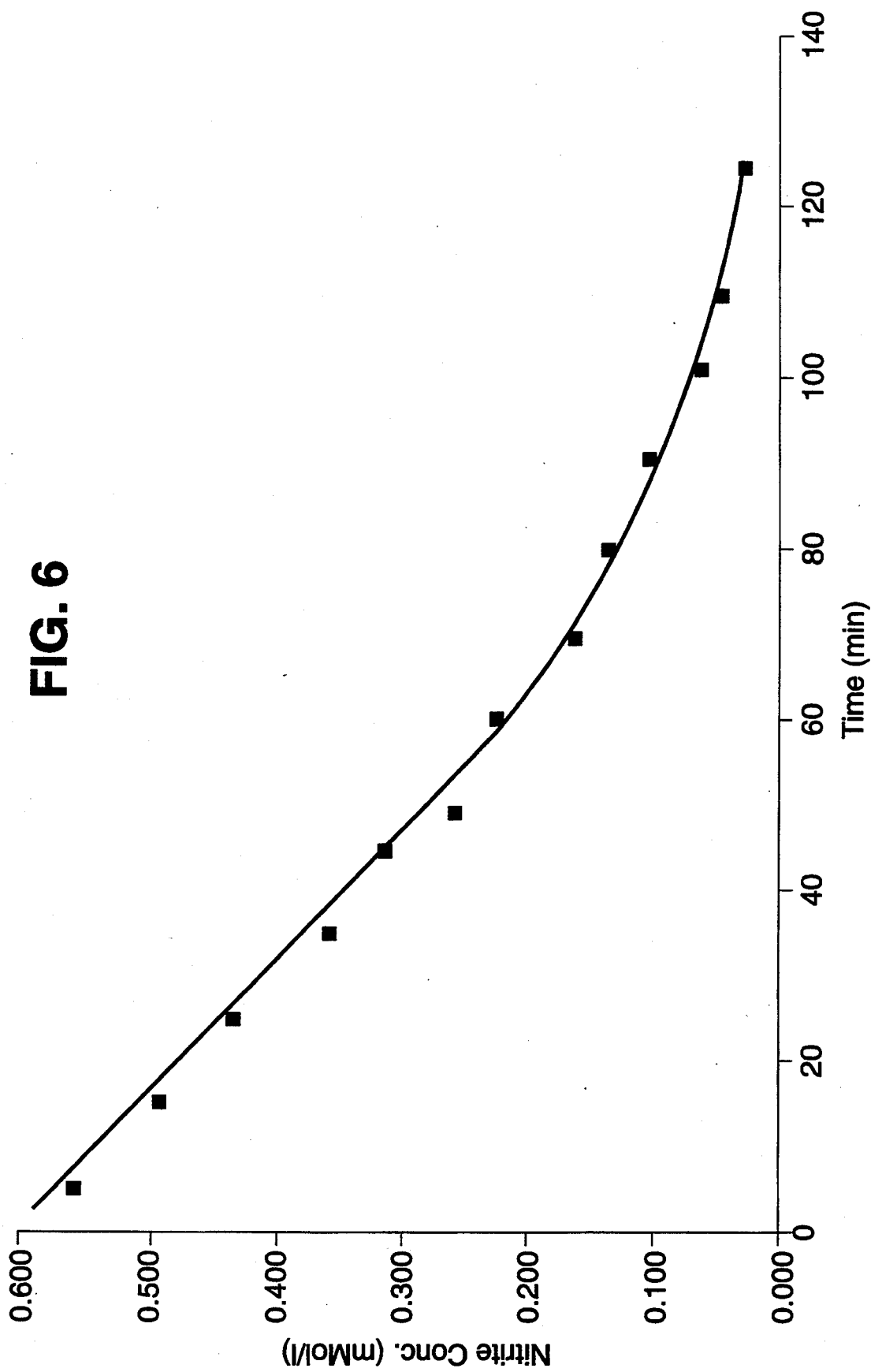
FIG. 6 shows a diagram in which is illustrated the decrease of the nitrite per unit time in the case of the determinatiom of the activity of nitrite-oxidizing bacteria.

Determination of the Activity of the Nitrite-Oxidising Bacteria in the Activated Sludge The measurement procedure described in Example 1 can also be used for the determination of the activity of nitrite-oxidising bacteria. Instead of ammonium, nitrite is added to the batch in a concentration of 0.6 mM and the formation of nitrite from ammonium residues in the activated sludge is suppressed by inhibition of the ammonium-oxidizing bacteria with 5 mg. allylthiourea per liter. FIG. 6 of the accompanying drawings shows the decrease of the nitrite with reference to the time. During the first 60 minutes, the decrease is linear so that the determination of the activity of nitrite-oxidising bacteria can be carried out according to the two-point measurement described in Example 1 5 and 15 minutes after commencement of the incubation. From the measured data in FIG. 6 of the accompanying drawings there is given an oxidation velocity of the nitrite of 6.5 nMoles per ml. and per minute and from this, as for the ammonium oxidation in Example 1, a specific activity of 2.49 nCatal per gram of moist weight of the activated sludge used. The activities of the ammonium-oxidizing and of the nitrite-oxidizing bacteria are thus balanced, which is a prerequisite for an optimum course of the total nitrification in the clarification works.

EXAMPLE 3

Measurement of the Ammonium and Nitrite Oxidation with an Oxygen Electrode

Figure 7:
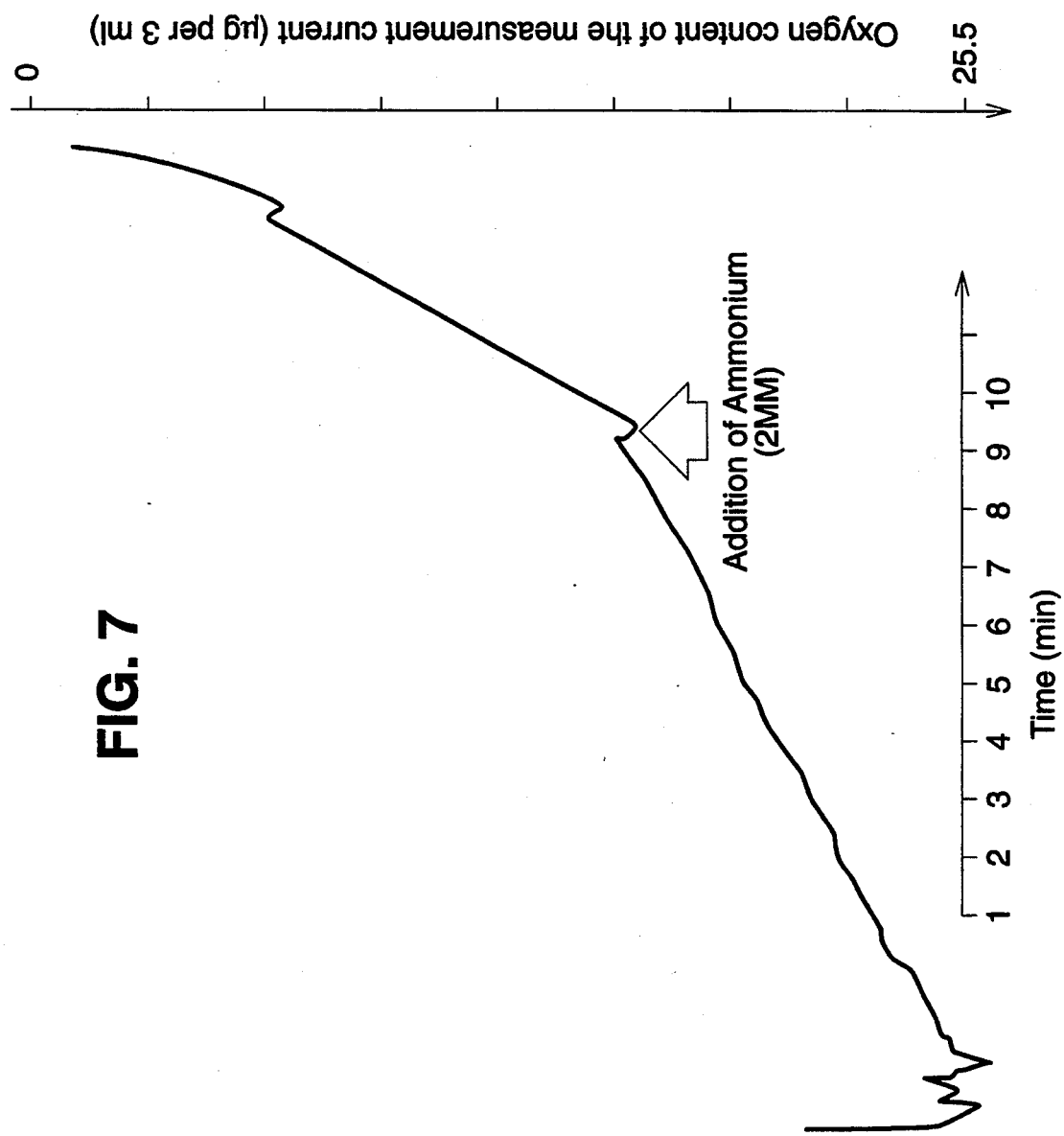
FIG. 7 shows a diagram in which are plotted the results of the measurement with an oxygen electrode per unit time.

Activated sludge from the Heidelberg clarification works was aerated for 30 minutes in order completely to remove residues of ammonium and nitrite. 100 µl. of the sludge were then mixed into 3 ml. of the salt medium described in Example 1 and placed into a salt cuvette with an oxygen electrode (Clark principle). FIG. 7 of the accompanying drawings shows the recorder curve in the case of paper feed rate of 1 cm. per minute. The temperature in the measurement cuvette was kept constant at 30° C. For calibration, the measurement cuvette was filled with oxygen-saturated water and the oxygen was removed with sodium dithionite. Since the oxygen concentration in the oxygen-saturated water at 30° C. amounts to 8.5 mg./liter and the volume of the measurement cuvette is 3 ml., the maximum decrease of the electrical potential measured on the recorder corresponds to an amount of oxygen of 25.5 µg. By calibration of the measurement cuvette, the recorder deflection can be precisely associated with an amount of oxygen.

As is to be seen from FIG. 7 of the accompanying drawings, after supply of the cuvette with activated sludge, there is first to be ascertained a decrease of the oxygen due to endogenic respiration of the bacteria. After the addition of 2 mM ammonium sulphate, an increase of the respiratory activity is to be ascertained. An increase of the respiratory activity is also to be observed by the addition of 0.6 mM sodium nitrite. From the increase of the oxygen consumption after the addition of the substrate, the catalytic activity of the activated sludge can be calculated with regard to the ammonium or nitrite oxidation similarly to Example 1. As reference value there is again suitable the moist weight of the introduced activated sludge.

EXAMPLE 4

Determination of the Speed of the Phosphate Take-Up by an Activated Sludge from Clarification Works with Biological Dephosphatization Activated sludge from three clarification works in Berlin (Sarfert, Boll, Kayser and Peter, Biologische Phosphorentfernung in den Klärwerken Berlin-Ruhleben und Berlin-Marienfelde, 1989, gwf Wasser Abwasser, Volume 130, pp. 121-130) were measured for the speed of the biological phosphate removal in a procedure similar to that in Example 1. Instead of the above-described salt medium for nitrifying bacteria, there was used a medium defined for dephosphatizing bacteria (Gersberg and Allen, Phosphorus uptake by Klebsiella pneumoniae and Acinetobacter calcoaceticus, 1985, Water Science and Technology, Volume 17, pp. 113-118) hereby incorporated by references. The pH value was adjusted to 7.2. As substrate, there was added 0.2 mMolar sodium phosphate. At different times, samples were taken, the sludge was removed by centrifuging and the phosphate content was photometrically quantified as phosphomolybdenum complex after tenfold dilution (phosphomolydenum blue method, DEV DIN 38405-D11) hereby incorporated by references.

Figure 8:
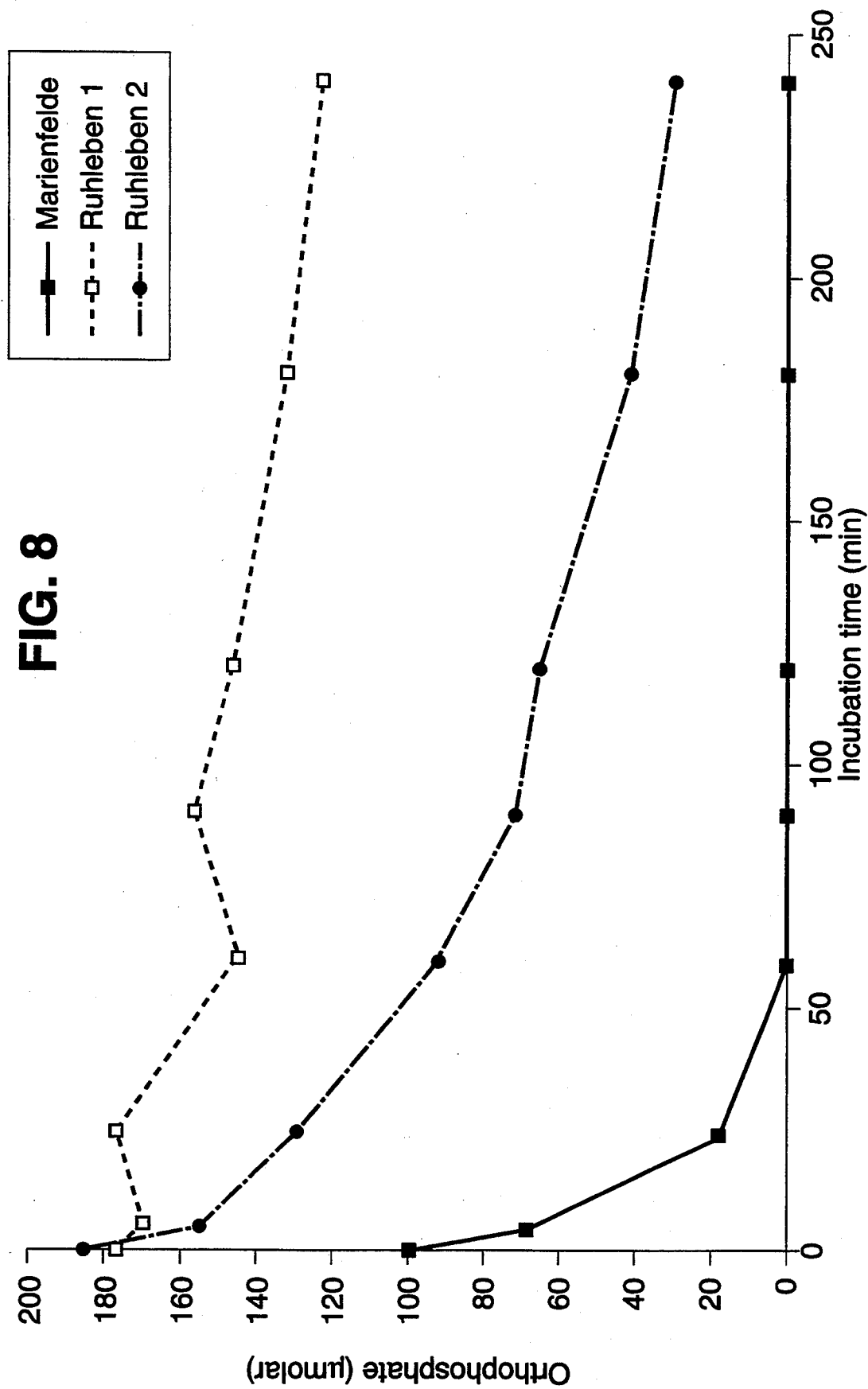
FIG. 8 shows a diagram in which is illustrated the velocity of the take-up of phosphate.

FIG. 8 of the accompanying drawings shows the uptake of phosphate dependent upon the time in which case, as in Example 1, from the initial speed there can be calculated a measured value which describes the efficiency of a dephosphatization sludge.

EXAMPLE 5

Comparison of a Conventional Measurement of the Nitrification Efficiency with the New Measurement FIG. 9 of the accompanying drawings shows the course of the nitrification efficiency in the Heidelberg clarification works in the first row of ponds, compared with the average values of the second, third and fourth rows of ponds. For the determination, the ammonium concentration was measured in the run-off and in the inflow into the activated ponds in daily mixed samples and the nitrification efficiency calculated as percentage decrease of the ammonium concentration. FIGS. 10 and 11 of the accompanying drawings show the specific activities of the ammonium oxidizing and nitrite-oxidizing bacteria determined with the two-point measurements described in Examples 1 and 2. Whereas the conventionally determined nitrification efficiency in FIG. 9 can only be interpreted over a comparatively long period of time, with the new test systems changes can be ascertained and assessed quickly and exactly.

EXAMPLE 6

Prediction of the Breakdown Efficiency of a Clarification Works on the Basis of Kinetic Measurements On the Jan. 12, 1989, the north clarification works in Heidelberg were loaded with, in all, 1.48 metric tons of ammonium nitrogen and 27% thereof, i.e. 400 kg., could be broken down. In the inflow was ascertained a concentration of 18 mg./liter and in the outflow a concentration of 13 mg./liter of ammonium nitrogen.

In the activated sludge of the clarification works were measured on this day in pond rows 1 to 4 average activities of the ammonium-oxidizing bacteria of 163 nCatal per liter. Since an ammonium concentration of 18 mg./liter in the waste water lies in the substrate saturation region of the ammonium oxidation (see FIG. 4), the activated ponds would, on the basis of these results, have been able to react 1.568 metric tones of ammonium nitrogen in the case of an optimum pond temperature of 30° C. in the case of a waste water/return sludge ratio of 1:1 and a pond volume of, in all, 15,920 m$^3$. With the help of the temperature characteristic for the ammonium oxidation in FIG. 3 of the accompanying drawings, there can now be predicted or confirmed the breakdown efficiencies of the clarification works at different temperatures. According to this, the clarification works could oxidize 345 kg. of ammonium at the average temperature of 15° C. measured in the rows of ponds, which roughly agrees with the actually measured value of 400 kg.

EXAMPLE 7

Optimization of the Ammonium and Nitrite Oxidation Efficiency of a Clarification Works by Process-Technical Interferences FIGS. 10 and 11 of the accompanying drawings illustrate the results of activity measurements for the ammonium and nitrite oxidation of activated sludges from the four rows of ponds of the northern clarification works in Heidelberg over the course of 3½ months. The activity of the sludges could be improved by three process-technical measures. In FIG. 10, from the January 20

(open arrow), excess sludge (daily about 20% of the amount of activated sludge) with a high ammonium oxidation activity could be pumped from pond row 4 into pond row 2 with a lower ammonium oxidation activity, whereby its activity could be improved and stably balanced with the other activated ponds. On January 11, the micronutrient folic acid was dosed into pond row 1 in a concentration of 0.1 ppm. Since, at the same time, all four rows of ponds were supplied with ferric chloride in a concentration of 80 g. per kg. dry weight of sludge, the folic acid, in conjunction with the iron ions, acted to inhibit on the ammonium (FIG. 10) and nitrite oxidation (FIG. 11). After the supply of iron salt was stopped in the middle of February, the micronutrient promoted the oxidation of the two nitrogen compounds (see FIGS. 10 and 11).

In FIG. 11 on January 11, the nitrite oxidation in pond row 4 was increased 3 to 4 fold (open arrow) by increasing the oxygen concentration from the value of 2 mg., recommended by the waste water technical organisation, to 3 mg./liter by strong aeration, whereby the emission of nitrite from the clarification works was suppressed. On January 22 (closed arrow), the oxygen concentration was also increased in the other rows of ponds, whereby the activity of the nitrite oxidation was increased in pond rows 2 and 3, but not in pond row 1 since here folic acid, in conjunction with iron ions, inhibited the nitrite oxidation.

It will be understood that the specification and examples are illustrative but not limitative of the present invention and that other embodiments within the spirit and scope of the invention will suggest themselves to those skilled in the art.

We claim:

1. Process for the regulation of the nitrification of an activated sludge step of a clarification plant by control of the biocatalytic decomposition capability of the activated sludge for an ammonium or a nitrite substrate consisting essentially of incubating the activated sludge sample under precisely defined conditions with aeration, which conditions are optimized with regard to pH value, temperature and salt concentration, with an ammonium or nitrite substrate present in a concentration above the saturation range, and measuring kinetically in an initial velocity phase the value of a decrease of the ammonium or nitrite substrate or an increase of a nitrite or nitrate oxidation product of the substrate by means of two measurements within an interval of 5 to 60 minutes as a measure of the biocatalytic decomposition capability for the substrate, and using the measured value as determined as a value for regulating the control and efficiency of the clarification plant for the nitrite or ammonium substrate.

2. The process according to claim 1 for the control of the nitrification, biological phosphate elimination, denitrification, removal of heavy metals or the difficult breakdown of organic substances of a clarification plant.

3. The process according to claim 1 comprising using the two point measurement for the prediction of the efficiency of a clarification plant under differing operational conditions and for the improvement of this efficiency by change of the process technology.

4. Process for the regulation of the activated sludge step of a clarification plant by control of the decomposition capability of the activated sludge, comprising incubating an activated sludge sample under defined conditions of pH, temperature and salt with a substrate present in an amount above its saturation range selected from the substrate group consisting of ammonium, nitrite, phosphate, nitrate, heavy metals and halogenated hydrocarbons, and measuring kinetically in an initial velocity interval of 5–60 minutes in two measurements at different times the value of a decrease of the substrate or an increase of a decomposition product of the substrate as a decomposition capability for the substrate, and using the measured value as a value for regulating the control of the clarification plant for the substrate.

* * * * *

UNITED STATES PATENT AND TRADEMARK OFFICE
CERTIFICATE OF CORRECTION

PATENT NO. : 5,403,488

DATED : April 4, 1995

INVENTOR(S) : Andreas Volsch, et al.

It is certified that error appears in the above-identified patent and that said Letters Patent is hereby corrected as shown below:

On the title page, and column 1, line 3:
    In the Title [54]: for PLAN" read -- PLANT --.

Signed and Sealed this

Twenty-seventh Day of February, 1996

Attest:

BRUCE LEHMAN

Attesting Officer    Commissioner of Patents and Trademarks